(12) United States Patent
Brown et al.

(10) Patent No.: US 7,617,438 B2
(45) Date of Patent: Nov. 10, 2009

(54) METHOD AND APPARATUS FOR SUPPORTING CHECKSUM OFFLOAD IN PARTITIONED DATA PROCESSING SYSTEMS

(75) Inventors: Deanna Lynn Quigg Brown, Phoenix, AZ (US); Vinit Jain, Austin, TX (US); Baltazar De Leon, III, Austin, TX (US); Kyle Alan Lucke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/825,142

(22) Filed: Apr. 15, 2004

(65) Prior Publication Data

US 2005/0232279 A1    Oct. 20, 2005

(51) Int. Cl.
*H03M 13/00* (2006.01)
(52) U.S. Cl. ...................... 714/774; 714/776
(58) Field of Classification Search ............. 714/774, 714/776
See application file for complete search history.

(56) References Cited

U.S. PATENT DOCUMENTS

| | | | | |
|---|---|---|---|---|
| 4,843,541 A | * | 6/1989 | Bean et al. | 710/36 |
| 5,430,842 A | * | 7/1995 | Thompson et al. | 709/236 |
| 5,659,756 A | * | 8/1997 | Hefferon et al. | 710/200 |
| 5,768,281 A | * | 6/1998 | Takano | 370/503 |
| 6,085,076 A | * | 7/2000 | Lindsay et al. | 455/277.1 |
| 6,145,024 A | * | 11/2000 | Maezawa et al. | 710/14 |
| 6,415,135 B1 | * | 7/2002 | Salomaki | 455/45 |
| 6,618,396 B1 | * | 9/2003 | Kondo et al. | 370/474 |
| 2003/0058862 A1 | * | 3/2003 | Lansing et al. | 370/392 |

\* cited by examiner

*Primary Examiner*—Joseph D Torres
(74) *Attorney, Agent, or Firm*—Yee & Associates, P.C.; Diana R. Gerhardt

(57) ABSTRACT

A method, apparatus, and computer instructions for processing a data packet in an interpartition virtual network in the logical partitioned data processing system. A state of a first flag and a state of a second flag is identified in the data packet, in response to receiving the data packet at a first partition in the interpartition virtual network from a second partition in the interpartition virtual network in the logical partitioned data processing system. A checksum is selectively verified for the data packet based on the state of the first flag and the state of the second flag.

38 Claims, 5 Drawing Sheets

100 DATA PROCESSING SYSTEM

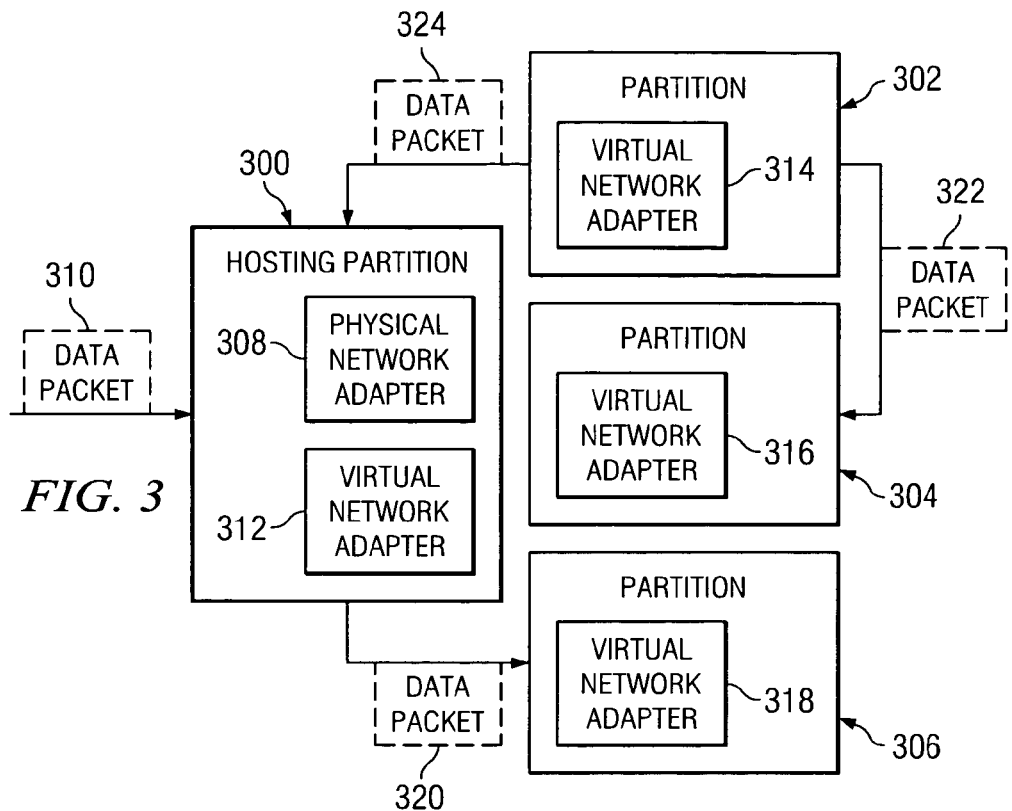
FIG. 3
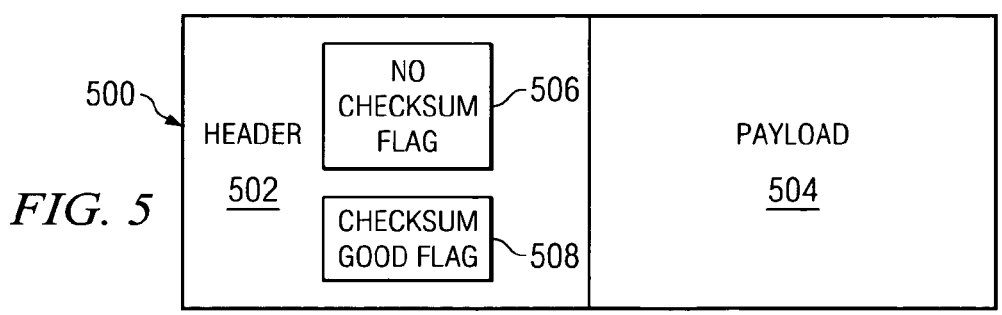
FIG. 4
FIG. 5

METHOD AND APPARATUS FOR SUPPORTING CHECKSUM OFFLOAD IN PARTITIONED DATA PROCESSING SYSTEMS

BACKGROUND OF THE INVENTION

1. Technical Field

The present invention relates generally to an improved data processing system and in particular to a method and apparatus for processing data. Still more particularly, the present invention relates to a method, apparatus, and computer instructions for processing data packets.

2. Description of Related Art

With the widespread use of networks, data packets are transmitted between different data processing systems. Each time a data packet is received, the data packet is processed before passing the data in the packet up to an application for use. In processing a data packet, a checksum calculation is performed to verify that the data in the data packet was transmitted without errors. Such a calculation is present when using transmission control protocol/Internet protocol (TCP/IP).

When these checksum calculations are performed by the host processor or processors in a data processing system, the calculations are a processor intensive task. Many network adapters provide a task offload feature called checksum offload. With this feature, the network adapter calculates the needed checksums to verify whether the data packet is a good data packet. Additionally, checksum offload also provides for generating and adding checksums to data packets that are to be transmitted onto a network. As used herein, the term calculating with respect to checksums involves both the process of generating a checksum to send a data packet and verifying a checksum when a data packet is received. In this manner, the processor resources of the host processor or processors are freed up for other uses.

The resources freed by the offload feature are reduced in data processing systems that partition resources. Increasingly large symmetric multi-processor data processing systems are being partitioned and used as smaller systems. These types of systems also are referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocatable resources include one or more architecturally distinct processors with their interrupt management area, regions of system memory, and input/output (I/O) adapter bus slots. The partition's resources are represented by the platform's firmware to the operating system image.

With a logical partitioned data processing system, a number of partitions may be present in which each partition has an operating system that may send or receive data packets, using virtual and physical network adapters. In many cases, only a single physical network adapter is present and cannot be shared by all of the partitions. A virtual network adapter may be used by the other partitions to send and receive data packets between the partitions without a physical network adapter. In this type of setup one of the partitions is associated with the physical network adapter and a virtual network adapter. This partition is referred to as the hosting partition. The other partitions use virtual adapters to send packets to each other in what is called an interpartition virtual network. The virtual adapters also are used to send data packets to the hosting portion for transport outside of the interpartition virtual network.

Currently, each partition is required to generate and verify checksums when sending data packets using virtual network adapters. No hardware supporting checksum offload is available in all but the hosting partition. In this situation, the use of processor resources is intensive, even if the physical adapter supports checksum offload because only one partition, the hosting partition does not need to verify a checksum.

Therefore, it would be advantageous to have an improved method, apparatus, and computer instructions for verifying checksums for data packets.

SUMMARY OF THE INVENTION

The present invention provides a method, apparatus, and computer instructions for processing a data packet in an interpartition virtual network in the logical partitioned data processing system. A state of a first flag and a state of a second flag is identified in the data packet, in response to receiving the data packet at a first partition in the interpartition virtual network from a second partition in the interpartition virtual network in the logical partitioned data processing system. A checksum is selectively verified for the data packet based on the state of the first flag and the state of the second flag.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram of components used in supporting a checksum offload feature in accordance with a preferred embodiment of the present invention;

FIG. 4 is a table identifying when checksums are verified in accordance with a preferred embodiment of the present invention;

FIG. 5 is a diagram of a data packet sent and received by a virtual network adapter in accordance with a preferred embodiment of the present invention;

DETAILED DESCRIPTION OF THE PREFERRED EMBODIMENT

Figure 1:
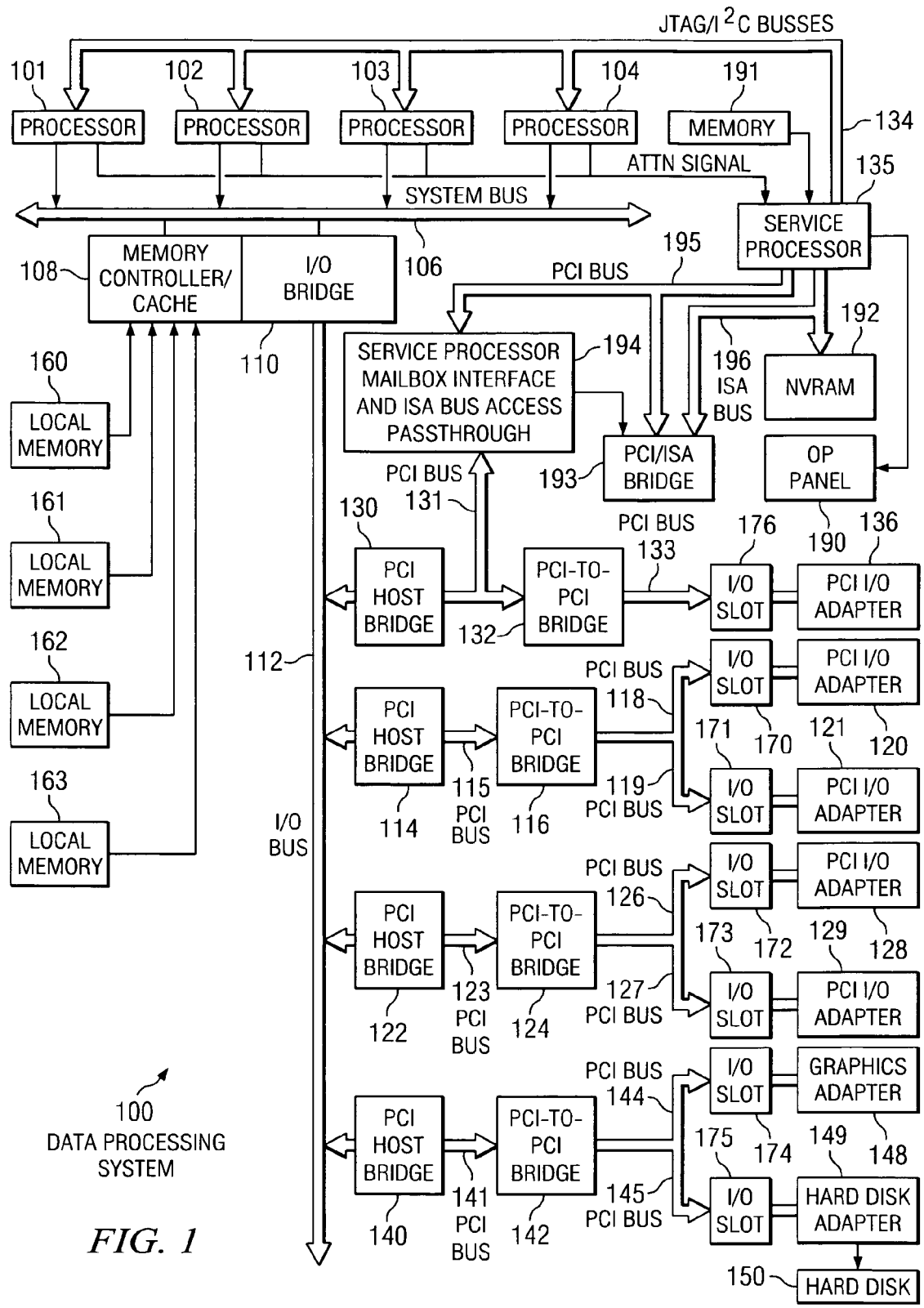
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively.

In this manner, additional I/O devices, such as, for example, modems or network adapters may be supported through each of PCI I/O adapters 128-129. In this manner, data processing system 100 allows connections to multiple network computers. In these illustrative examples, at least one of these PCI I/O adapters is a physical network adapter that is associated with a logical partition in data processing system 100.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
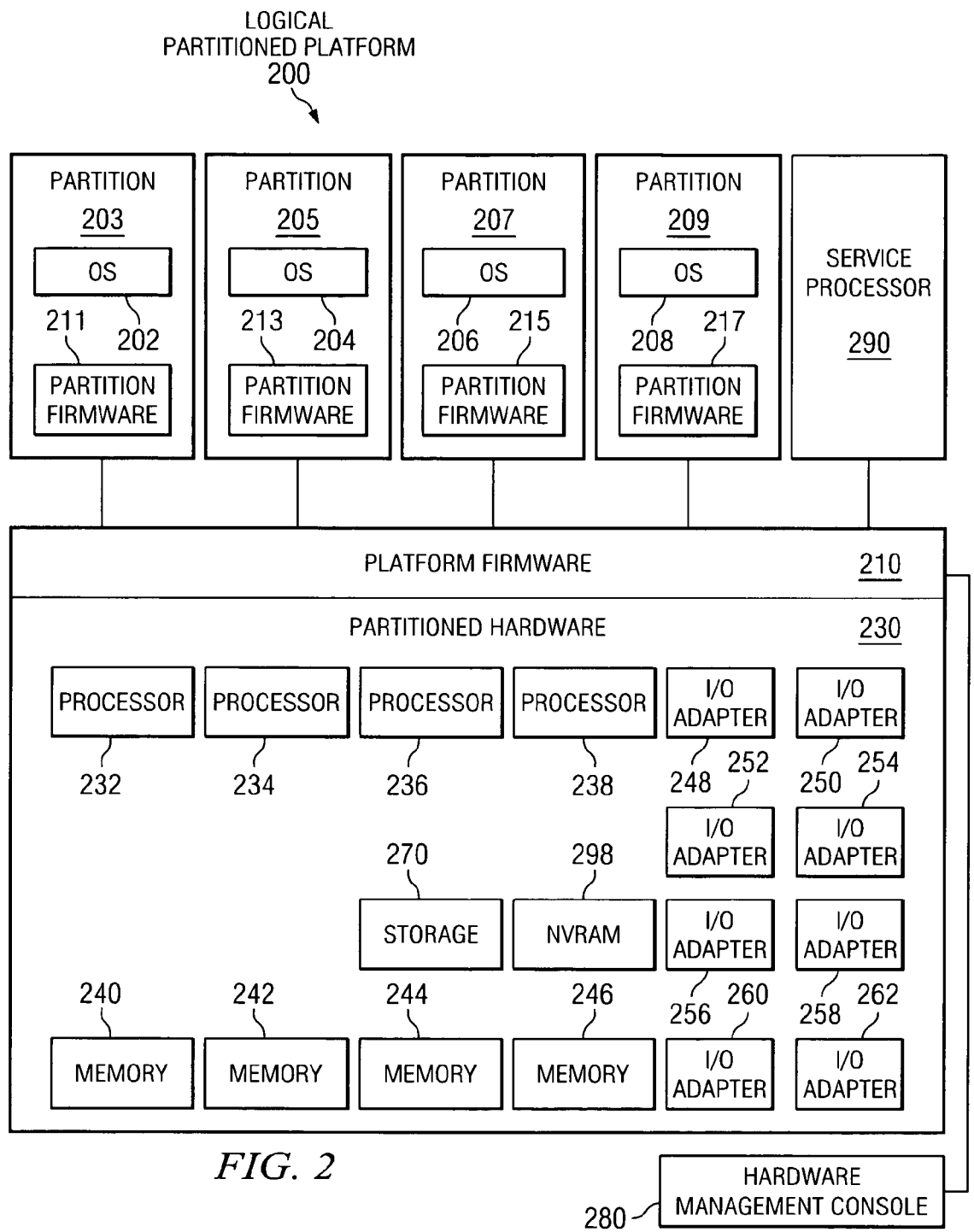
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

In these illustrative examples, one of I/O adapters 248, 250, 252, 254, 256, 258, 260, and 262 is a physical network adapter that is associated with one of partitions 203, 205, 207, and 209. This partition is referred to as the hosting partition and also includes a virtual adapter for use in sending and receiving data packets with the other partitions. The other partitions only have virtual adapters for use in transmitting packets. With this configuration, the other partitions may send traffic to the hosting partition with the hosting partition then sending packets over the physical network adapter. In this manner, network access is provided to partitions that are not associated with or own physical network adapters.

The present invention provides an improved method, apparatus, and computer instructions for processing data packets in a logical partitioned data processing system. More particularly, the present invention provides a checksum offload mechanism for use by partitions in a logical partitioned data processing system to reduce the amount of checksum verifications that are performed in transporting data. The present invention recognizes that it is not necessary to verify that data in data packets sent from one partition to another partition when the data originates within one of the partitions. This data is transferred between the different partitions using virtual network adapters. In essence, a interpartition virtual network is formed through the use of these virtual network adapters.

In other words, a interpartition virtual network contains partitions, in a logical partitioned data processing system, that communicate with each other using virtual network adapters. A virtual network adapter is implemented using a device driver. Physical network adapters also use a network device driver. In these illustrative examples, the device driver for the virtual network adapter looks like the device driver for a physical network adapter. These virtual network adapters are not totally indistinguishable from physical network adapters because the device drivers for virtual network adapters include a flag to let the operating system know that the network adapter is a virtual one. Additionally, these types of device drivers also keep slightly different statistics. However, for the purposes of sending or receiving a data packet, they work in the same way as those for physical network adapters. Virtual network adapters allow for the different partitions to share a physical network adapter.

The present invention also recognizes that a partition, sending a data packet to another partition using a virtual network adapter, does not need to generate a checksum if the data packet will eventually be sent over a physical network adapter and if that physical network adapter supports checksum offload. Further, verification of a checksum is unnecessary if the data packet arrived over a physical network adapter that supports checksum offload and the checksum is verified to be good.

Also recognized by the present invention, is that if a data packet is to be sent to any partition within the interpartition virtual network that does not support checksum offload, a checksum is generated. With respect to the component that generates the checksum in these illustrative examples, the sending partition does not know whether a data packet will be delivered to a partition that supports checksum offload, one that does not, or bridged on to a physical network, when a data packet is to be sent by the sending partition. As a result, this partition is unable to decide whether to generate the checksum. As a result, the sending partition never generates a checksum. Instead, in these illustrative examples, if a data packet is to be delivered to a partition that does not support checksum offload, platform firmware, such as a hypervisor, generates and adds a checksum to the data packet before delivering the data packet. The hypervisor performs this function because this component has knowledge of which virtual adapters support checksum offload and which virtual adapters do not support this feature in the illustrative examples.

A data packet originating from outside the interpartition virtual network has its checksum verified at the final destination if the data packet was routed or bridged onto the interpartition virtual network without having the checksum being verified to be good by the physical adapter receiving the data packet.

The mechanism of the present invention, in these examples, takes into account these situations by providing information in the form of flags for use in sending and receiving data packets within an interpartition virtual network. More specifically, two flags are used in sending and receiving data packets in the illustrative embodiments.

With reference now to FIG. 3, a diagram of components used in supporting a checksum offload feature is depicted in accordance with a preferred embodiment of the present invention. Hosting partition 300, partition 302, partition 304, and partition 306 are partitions within a logical partitioned data processing system, such as logical partitioned platform 200 in FIG. 2. These partitions form a interpartition virtual network for transferring data between the partitions.

Hosting partition 300 is designated as the hosting partition because this partition contains physical network adapter 308, which receives data, such as data packet 310 from originating from outside of the interpartition virtual network. Hosting partition 300 also includes virtual network adapter 312, which is used to send and receive data from the other partitions. Partition 302 includes virtual network adapter 314; partition 304 contains virtual network adapter 316; and partition 306 includes virtual network adapter 318. These virtual adapters are used to transfer data between the partitions. The handling of the traffic between the different partitions in the interpartition virtual network is located in platform firmware, such as platform firmware 210 in FIG. 2. This component acts as a router or switch to facilitate the traffic between partitions.

In accordance with an illustrative embodiment of the present invention, each of the data packets sent or received by a virtual network adapter includes two flags, (1) a no checksum flag, and (2) a checksum good flag. The no checksum flag indicates that no checksum is present in a data packet when this flag is set. A checksum good flag indicates that the checksum in the data packet has been verified as being good when this flag is set.

In these illustrative examples, the flags are placed into a header in a data packet by platform firmware, such as a hypervisor instead of the partition. If a partition supports checksum offload, the hypervisor knows to set the no checksum flag. If a partition does not support checksum offload, the hypervisor does not set either flag. The hypervisor adds this header because partitions that do not support checksum offload do not know to add the header. When the hypervisor delivers data packets, the hypervisor informs partitions, supporting this mechanism, as to the values of the flags. The hypervisor does not inform partitions that do not support checksum offload because these partitions do not understand how to handle the flags.

Turning next to FIG. 4, a table identifying when checksums are verified is depicted in accordance with a preferred embodiment of the present invention. Table 400 indicates when a checksum is to be verified based on the state of a no checksum flag and a checksum good flag. A checksum is verified if the no checksum flag and the checksum good flag are unset in a logical 0 state. The checksum good flag may be unset if the partition does not support checksum offload. Further, this checksum flag also may be unset if the checksum has been verified as not being good. Although a second verification may occur, this situation is uncommon and does not have an impact on the performance.

A checksum is not calculated if the no checksum flag is unset, a logical 0, and the checksum good flag is set, a logical 1. A checksum is not verified if a no checksum flag is set, a logical 1, and a checksum good flag is unset, a logical 0.

For example, with reference back to FIG. 3 when data packet 310 is received by physical network adapter 308 the checksum is verified by this physical network adapter if checksum offload is supported. The data from data packet 310 may be transferred to another partition, such as partition 306 in data packet 320 using virtual network adapter 312. With reference to FIG. 5, a diagram of a data packet sent and received by a virtual network adapter is depicted in accordance with a preferred embodiment of the present invention. Data packet 500 includes header 502 and payload 504. No checksum flag 506 and checksum good flag 508 are located within header 502 in these illustrative examples.

With reference back to FIG. 3, the no checksum flag is unset while the checksum good flag is set in response to the checksum of data packet 310 being verified by physical network adapter 308. Virtual network adapter 318 receives data packet 320. Based on the state of these flags, the checksum does not need to be verified by partition 306. In this manner, the number of checksum verifications performed is reduced by using these two flags. Consequently, this feature reduces the amount of processor resources used to verify checksums in a logical partitioned data processing system.

In another example, partition 302 generates and sends data packet 322 to partition 304. In this case, no checksum is generated or placed into data packet 322 when a partition initiates the initiation of data packets and sends the data packets onto the interpartition virtual network. The no checksum flag is set and the checksum good flag remains unset. In these illustrative examples, the flags default in an unset or logical 0 state. As a result, partition 304 does not verify a checksum for data packet 322 because the data originated within the interpartition virtual network.

In yet another example, partition 302 generates data packet 324 and sends this data packet to hosting partition 300 to be sent to a destination that is outside of the virtual area network. The no checksum flag may be set in data packet 324. In response to receiving this data packet, physical network adapter 308 generates a checksum before sending a data packet with the data from data packet 324 onto a physical network. This situation may occur if a data packet is sent from a partition that supports checksum offload to a location outside of the interpartition virtual network. Two cases may exist when a partition is a supporting partition that transmits a data packet outside of the interpartition virtual network. In one case, the physical network adapter supports checksum offload and the partition allows the adapter to generate the checksum when the data packet is sent. In the second case, the physical network adapter for this partition does not support checksum offload. In this case, the partition generates the checksum before sending the data packet for transmission by the physical network adapter.

If a partition routes or bridges traffic from outside of the logical partitioned data processing system onto the interpartition virtual network, the partition does not set the no checksum flag. If the partition's incoming physical network adapter supported checksum offload and indicated that the checksum is good, the partition sets the checksum good flag to indicate that the checksum has been verified.

Also, a hosting partition that supports checksum offload verifies the checksum only if the flags indicate that the checksum exists and has not already been verified. These states are the default values of the flags. Any data packets sent by partitions that do not support checksum offload do have not any flags set. As a result, the flags will have these default values. In other words, these flags may be used in the case that there is a partition within the interpartition virtual network that does not support the mechanism of the present invention.

In summary, with partitions that do not support checksum offload features of the present invention, all packets will have checksums calculated on send and verified on receipt, just like current non-checksum-offload systems. Additionally, the flags will not be set on send or seen on receipt.

The hosting partition could support checksum offload even if the physical adapter it is using does not. If the physical adapter does not support checksum offload, and the hosting partition receives a packet where the flags indicate that no checksum exists in the packet, once the partition determines that the packet will be sent out an adapter that does not support checksum offload, it must generate a checksum before sending the packet. If it determines that the adapter to be used does support checksum offload, it will set up the correct information to pass to the adapter so that the adapter will generate the checksum before sending the packet.

In this manner, the mechanism of the present invention avoids calculating checksums when sending data packets between partitions that are able to recognize and process the flags. Further, checksums may be avoided when sending data over a shared physical network adapter that supports checksum offload. The mechanism of the present invention also allows interoperation with partitions and physical network adapters that do not support a checksum offload feature.

Figure 6:
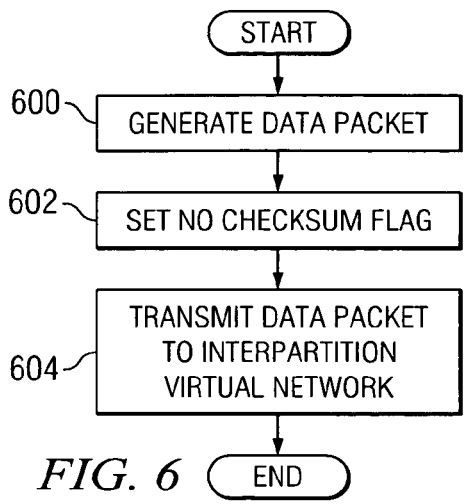
FIG. 6 is a flowchart of a process for generating a data packet in accordance with a preferred embodiment of the present invention.

With reference now to FIG. 6, a flowchart of a process for generating a data packet is depicted in accordance with a preferred embodiment of the present invention. The process illustrated in FIG. 6 may be implemented in virtual network adapter, such as virtual network adapter 314 in FIG. 3. This process is initiated when data is sent between partitions in a interpartition virtual network and the data is not routed or bridged from outside of the interpartition virtual network onto the network.

The process begins by generating a data packet (step 600). Next, a no checksum flag is set (step 602). The setting of this flag indicates that no checksum is present in the data packet. This results in the receiving partition not verifying a checksum for the data packet. Then, the data packet is transmitted to a interpartition virtual network (step 604) with the process terminating thereafter.

Figure 7:
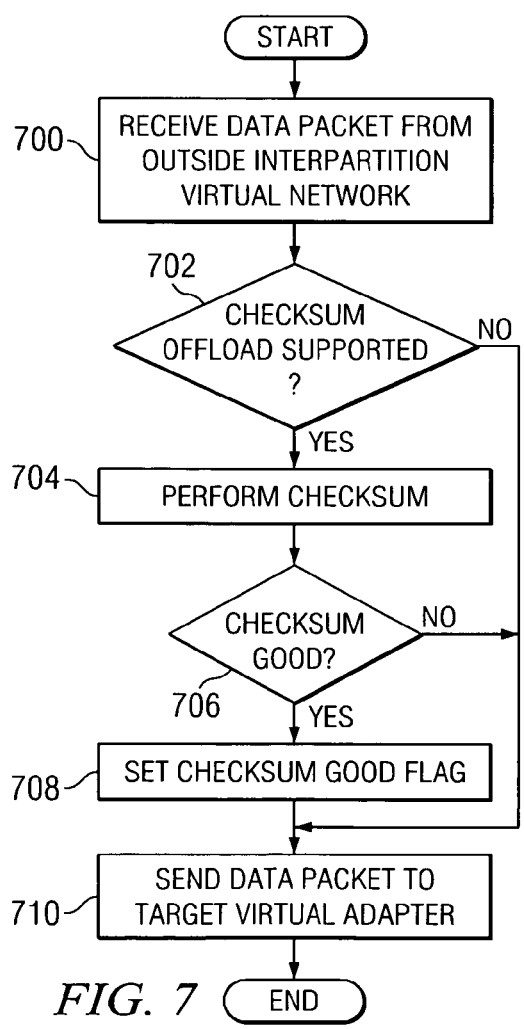
FIG. 7 is a flowchart of a process for selectively verifying a checksum in accordance with a preferred embodiment of the present invention.

With reference now to FIG. 7, a flowchart of a process for selectively verifying a checksum is depicted in accordance with a preferred embodiment of the present invention. The process illustrated in FIG. 7 may be implemented in a partition, such as hosting partition 300 in FIG. 3. In these illustrative examples, a physical network adapter that supports checksum offload verifies the checksum of a data packet upon receipt of a data packet. The physical network adapter informs the operating system of the result. A special piece of bridging software on the hosting partition examines the destination hardware address in the data packet and identifies that the data packet is not addressed to the hosting partition. This bridging software then sends the data packet out on the virtual network adapter, setting the checksum good flag. The setting of the flag is actually performed by the platform firmware. The bridging software sends an instruction or signal to the platform firmware to instruct the platform firmware to set the appropriate flags.

The process begins by receiving a data packet from outside a interpartition virtual network (step 700). In this illustrative example, the data packet is received by a physical network adapter. Next, a determination is made as to whether the checksum offload is supported (step 702). If the checksum offload is supported, then verification that the checksum is performed by the physical network adapter is conducted (step 704). Next, a determination is made as to whether the checksum is good (step 706). If the checksum is good, then the checksum good flag is set in a data packet that is to be sent onto the interpartition virtual network (step 708). This data packet is the same data packet as received in step 700. The platform firmware adds a small header to this data packet to hold the flags for when the data packet is sent onto the interpartition virtual network. Then, the data packet is sent to a target virtual adapter (step 710) with the process terminating thereafter.

Referring back to step 702, if the checksum offload is not supported, then the process proceeds to step 710 as described above. In step 706, if the checksum is not good, then the process proceeds to step 710 as described above. In this case, the checksum good flag remains in the default unset state.

Figure 8:
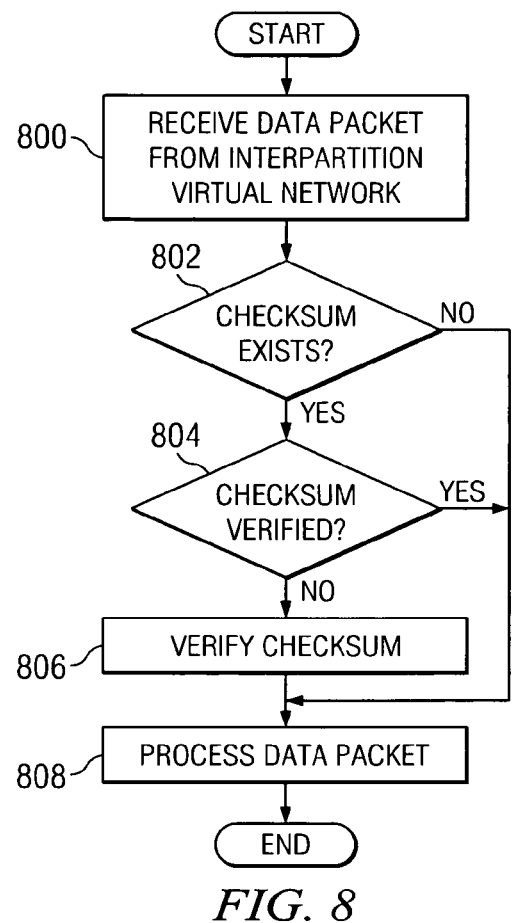
FIG. 8 is a flowchart of a process for receiving a data packet in a interpartition virtual network in accordance with a preferred embodiment of the present invention.

With reference now to FIG. 8, a flowchart of a process for receiving a data packet in a interpartition virtual network is depicted in accordance with a preferred embodiment of the present invention. The process illustrated in FIG. 8 may be implemented in a partition, such as partition 306 in FIG. 3.

The process begins by receiving a data packet from a virtual local area network (step 800). In step 800, the data packet is received at a virtual network adapter owned by the receiving partition. Next, a determination is made as to whether a checksum exists (step 802). This determination is made by identifying the state of the no checksum flag in the data packet. A checksum is present if the no checksum flag is unset in the data packet. If a checksum does exist, then a determination is made as to whether the checksum is verified (step 804). The determination in step 804 is made by identifying the state of the checksum good flag. If this flag is set, then the checksum has been verified as being good.

If the checksum is not verified, then the checksum is now verified (step 806). Next, the data packet is processed (step 808) with the process terminating thereafter. The processing in step 808 may include, for example, sending the data to an application in the partition for use or sending the data to another partition.

Referring back to step 802, if the checksum does not exist, then the process proceeds to step 808 as described above. In step 804, if the checksum is verified, then the process proceeds to step 808 as described above.

Figure 9:
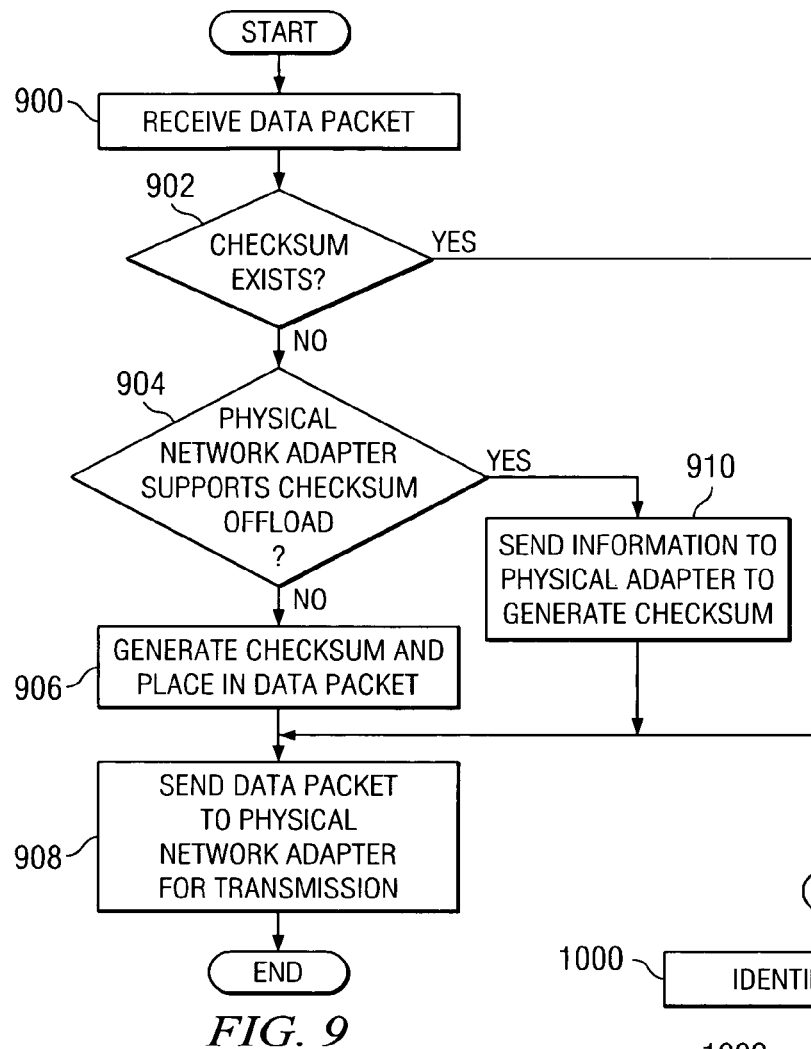
FIG. 9 is a flowchart of a process for receiving a data packet for transmission onto a physical network in accordance with a preferred embodiment of the present invention.

With reference now to FIG. 9, a flowchart of a process for receiving a data packet for transmission onto a physical network is depicted in accordance with a preferred embodiment of the present invention. The process illustrated in FIG. 9 may be implemented in a partition, such as hosting partition 300 in FIG. 3.

The process begins by receiving a data packet (step 900). The data packet is received from another partition in the interpartition virtual network. Next, a determination is made as to whether a checksum exists (step 902). This determination is made by identifying the state of the no checksum flag in the data packet. If a checksum does not exist, a determination is made as to whether the physical adapter owned by the partition supports the checksum offload (step 904). If the physical adapter does not support the checksum offload, the partition generates a checksum and places the checksum into a data packet (step 906). Then, a data packet is sent to the physical network adapter for transmission (step 908) with the process terminating thereafter. In this case, the physical network adapter will generate the checksum and place the checksum into the data packet.

Referring back to step 902, if a checksum does exist, the process proceeds to step 908 as described above. Referring back to step 904, if a physical adapter supports checksum offload, then information is sent to the physical adapter to generate the checksum (step 910) with the process then proceeding to step 908 as described above. In this case, the partition instructs the physical adapter to generate a checksum for the data packet.

Figure 10:
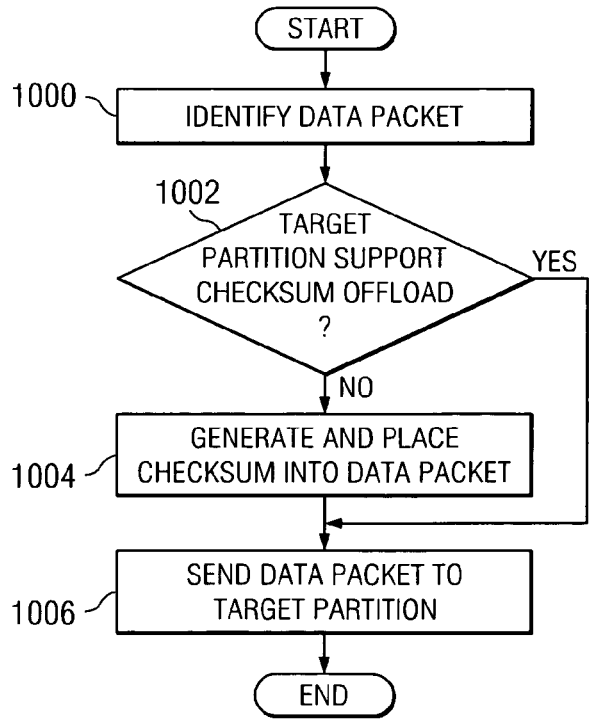
FIG. 10, a flowchart of a process for transmitting a data packet to a partition for transmission by a physical network adapter in accordance with a preferred embodiment of the present invention.

Turning next to FIG. 10, a flowchart of a process for transmitting a data packet to a partition for transmission by a physical network adapter is depicted in accordance with a preferred embodiment of the present invention. The process in FIG. 10 may be implemented in platform firmware, such as a hypervisor, in these illustrative examples.

The process begins by identifying a data packet that is to be sent from a partition to a target partition for transmission by a network adapter for the target partition (step 1000). A determination is then made as to whether the target partition supports the checksum offload (step 1002). The platform firmware is able to identify which partitions are able to support checksum offload in these illustrative examples. This information may be located in configuration information accessed by the platform firmware.

If the target partition does not support checksum offload, the checksum is generated and placed into the data packet (step 1004). Thereafter, the data packet is transmitted to the target partition (step 1006) with the process terminating thereafter.

With reference again to step 1002, if checksum offload is supported by the target partition, the process proceeds to step 1006 as described above.

Thus, the present invention provides an improved method, apparatus, and computer instructions for providing no checksum support within a logical partitioned data processing system. Through the use of indicators in the form of flags, the calculating and verifying checksums may be avoided in sending data between partitions in a interpartition virtual network. Further, the calculation of a checksum may be avoided when a shared physical network adapter supports checksum offload. In this manner, the use of processor resources for processor intensive calculations of checksums is reduced. As a result, performance of a logical partitioned data processing system is increased when compared to current systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrative embodiments only show the use of a single physical network adapter shard by four partitions. More than one physical network adapter may be present and other numbers of partitions may be employed. Also, the flags may have other default states, other than being unset as shown in the illustrative examples. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing a data packet in an interpartition virtual network in a logical partitioned data processing system, wherein the logical partitioned data processing system comprises a plurality of logical partitions that each simultaneously run an operating system therein, wherein each one of the logical partitions comprises a virtual network adapter that is used to send data packets to other virtual network adapters of other logical partitions within the logical partitioned data processing system to thereby form the interpartition virtual network, the method comprising:

responsive to receiving the data packet at a first partition in the interpartition virtual network from a second partition in the interpartition virtual network in the logical partitioned data processing system, identifying a state of a first flag and a state of a second flag in the data packet; and selectively verifying a checksum, by the first partition in the logical partitioned data processing system, for the data packet as indicated by the state of the first flag and the state of the second flag, wherein the first flag and the second flag are both checksum-based flags that indicate checksum characteristics associated with the data packet wherein verification of a checksum is unnecessary if the data packet arrived over a physical network adapter that supports checksum offload and the checksum is verified to be good.

2. The method of claim 1, wherein the first flag is a no checksum flag that is used by the selectively verifying step to determine whether or not there is a checksum value included in the data packet that is received and the second flag is a checksum good flag that is used by the selectively verifying step to determine whether or not the data packet has previously been verified as being good based on a checksum included in the data packet that is received.

3. The method of claim 2, wherein the selectively verifying step includes:
verifying the checksum for the data packet only if the first flag and the second flag are unset.

4. The method of claim 2, wherein the selectively verifying step includes:
skipping verification of the checksum if the first flag is set.

5. The method of claim 2, wherein the selectively verifying step includes:
skipping verification of the checksum for the data packet if the first flag is unset and the second flag is set.

6. The method of claim 2, wherein the second flag is conditionally unset by the logical partitioned data processing system if the packet was received through a first virtual adapter associated with the first partition.

7. The method of claim 2, wherein the first flag is conditionally set by the logical partitioned data processing system if the data packet, received from the second partition, originated from within the logical partitioned data processing system.

8. The method of claim 2, wherein the second flag is conditionally unset by the logical partitioned data processing system if the data packet, received from the second partition, was received from outside the interpartition virtual network in the logical partitioned data processing system without the checksum being checked.

9. The method of claim 8, wherein the first flag is conditionally unset by the logical partitioned data processing system and the second flag is conditionally unset by the logical partitioned data processing system if the data packet was received by a physical network adapter that (i) is associated with the second partition, and (ii) does not support checksum offload.

10. The method of claim 8, wherein the first flag is conditionally unset by the logical partitioned data processing system and the second flag is conditionally set by the logical partitioned data processing system if a physical adapter, supporting a checksum offload, verified the checksum as being good.

11. The method of claim 1, wherein the data packet is received by a first virtual adapter in the first partition connected to the interpartition virtual network, wherein the first virtual adapter is a software device driver that has no associated physical hardware.

12. The method of claim 1 further comprising:
generating a new data packet for a target destination;
conditionally generating the checksum for the new data packet only if the new data packet is to be sent outside of the interpartition virtual network by a physical network adapter; and
sending the new data packet to the target destination.

13. The method of claim 1, wherein the first flag and the second flag are added to a header of the data packet that is received by firmware of the logical data processing system during routing of the data packet, to a given partition of the logical partitioned data processing system, by the firmware.

14. The method of claim 1, wherein the identifying step comprises identifying a state of a first flag and a state of a second flag in a header in the data packet.

15. A logical partitioned data processing system for processing a data packet in an interpartition virtual network in a logical partitioned data processing system, wherein the logical partitioned data processing system comprises a plurality of logical partitions that are each operable for simultaneously running an operating system therein, wherein each one of the logical partitions comprises a data processor for running its respective operating system and a virtual network adapter that is used to send data packets to other virtual network adapters of other logical partitions within the logical partitioned data processing system to thereby form the interpartition virtual network, the data processing system comprising:
identifying means, responsive to receiving the data packet at a first partition in the interpartition virtual network from a second partition in the interpartition virtual network in the logical partitioned data processing system, for identifying a state of a first flag and a state of a second flag in the data packet; and
selectively verifying means, in a first partition in the logical partitioned data processing system, for selectively verifying a checksum for the data packet as indicated by the state of the first flag and the state of the second flag, wherein the first flag and the second flag are both checksum-based flags that indicate checksum characteristics associated with the data packet wherein verification of a checksum is unnecessary if the data packet arrived over a physical network adapter that supports checksum offload and the checksum is verified to be good.

16. The data processing system of claim 15, wherein the selectively verifying means comprises means for selectively verifying a checksum for the data packet as indicated by the state of the first flag and the state of the second flag, wherein the first flag is a no checksum flag located in the data packet that indicates to the selectively verifying means whether or not there is a checksum value included in the data packet that is received, and the second flag is a checksum good flag located in the data packet that indicates to the selectively verifying means whether or not the data packet has previously been verified as being good based on a checksum included in the data packet that is received.

17. The data processing system of claim 16, wherein the selectively verifying means includes:
verifying means for verifying the checksum for the data packet only if the first flag and the second flag are unset.

18. The data processing system of claim 16, wherein the selectively verifying means includes:
skipping means for skipping verification of the checksum if the first flag is set.

19. The data processing system of claim 16, wherein the selectively verifying means includes:
skipping means for skipping verification of the checksum for the data packet if the first flag is unset and the second flag is set.

20. The data processing system of claim 16, further comprising means for conditionally unsetting the second flag if the packet was received through a first virtual adapter associated with the first partition.

21. The data processing system of claim 16, further comprising means for conditionally setting the first flag if the data packet, received from the second partition, originated from within the logical partitioned data processing system.

22. The data processing system of claim 16, further comprising means for conditionally unsetting the second flag if the data packet, received from the second partition, was received from outside the interpartition virtual network in the logical partitioned data processing system without the checksum being checked.

23. The data processing system of claim 22, further comprising means for conditionally unsetting the first flag and the second flag if the data packet was received by a physical network adapter associated with the second partition.

24. The data processing system of claim 22, further comprising means for conditionally unsetting the first flag and conditionally setting the second flag if a physical network adapter, supporting a checksum offload, verified the checksum as being good.

25. The data processing system of claim 15, further comprising virtual adapter means for receiving the data packet in the first partition connected to the interpartition virtual network, wherein the virtual adapter means is a software device driver that has no associated physical hardware.

26. The data processing system of claim 15 further comprising:
first generating means for generating a new data packet for a target destination;
second generating means for conditionally generating the checksum for the new data packet only if the new data packet is to be sent outside of the interpartition virtual network by a physical network adapter; and
sending means for sending the new data packet to the target destination.

27. The data processing system of claim 15, further comprising means for adding, during internal routing of the data packet to a given partition of the logical partitioned data processing system, the first flag and the second flag to a header of the data packet that is received.

28. The data processing system of claim 15, wherein the first flag and the second flag are located in a header in the data packet.

29. A computer program product recorded on a computer readable, recordable-type medium and operable for processing a data packet in an interpartition virtual network by a logical partitioned data processing system, wherein the logical partitioned data processing system comprises a plurality of logical partitions that are each operable for simultaneously running an operating system therein, wherein each one of the logical partitions comprises a virtual network adapter that is used to send data packets to other virtual network adapters of other logical partitions within the logical partitioned data processing system to thereby form the interpartition virtual network, the computer program product comprising:
first instructions, responsive to receiving the data packet at a first partition in the interpartition virtual network from a second partition in the interpartition virtual network in the logical partitioned data processing system, for identifying a state of a first flag and a state of a second flag in the data packet; and
second instructions for selectively verifying a checksum, by the first partition in the logical partitioned data processing system, for the data packet as indicated by the state of the first flag and the state of the second flag, wherein the first flag and the second flag are both checksum-based flags that indicate checksum characteristics associated with the data packet wherein verification of a checksum is unnecessary if the data packet arrived over a physical network adapter that supports checksum offload and the checksum is verified to be good.

30. The computer program product of claim 29, wherein the first instructions comprise sub-instructions for (i) determining, using the first flag, whether or not there is a checksum value included in the data packet that is received and (ii) determining, using the second flag, whether or not the data packet has previously been verified as being good based on a checksum included in the data packet that is received.

31. The computer program product of claim 30, wherein the second instructions includes:
sub-instructions for verifying the checksum for the data packet only if the first flag and the second flag are unset.

32. The computer program product of claim 30, wherein the second instructions includes:
sub-instructions for skipping verification of the checksum if the first flag is set.

33. The computer program product of claim 30, wherein the second instructions includes:
sub-instructions for skipping verification of the checksum for the data packet if the first flag is unset and the second flag is set.

34. The computer program product of claim 30, further comprising instructions to conditionally unset the second flag if the packet was received through a first virtual network adapter associated with the first partition.

35. The computer program product of claim 30, further comprising instructions to conditionally set the first flag if the data packet, received from the second partition, originated from within the logical partitioned data processing system.

36. The computer program product of claim 30, further comprising instructions to conditionally unset the second flag if the data packet, received from the second partition, was received from outside the interpartition virtual network in the logical partitioned data processing system without the checksum being checked.

37. The computer program product of claim 36, further comprising instructions to conditionally unset the first flag and conditionally unset the second flag if the data packet was received by a physical adapter that (i) is associated with the second partition, and (ii) does not support checksum offload.

38. The computer program product of claim 36, further comprising instructions to conditionally unset the first flag and conditionally set the second flag if a physical network adapter, supporting a checksum offload, verified the checksum as being good.

* * * * *

UNITED STATES PATENT AND TRADEMARK OFFICE
CERTIFICATE OF CORRECTION

PATENT NO. : 7,617,438 B2  Page 1 of 1
APPLICATION NO. : 10/825142
DATED : November 10, 2009
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1064 days.

Signed and Sealed this

Nineteenth Day of October, 2010

David J. Kappos
*Director of the United States Patent and Trademark Office*